United States Patent
Rehberg et al.

(10) Patent No.: US 7,599,899 B2
(45) Date of Patent: Oct. 6, 2009

(54) REPORT CONSTRUCTION METHOD APPLYING WRITING STYLE AND PROSE STYLE TO INFORMATION OF USER INTEREST

(76) Inventors: Charles Rehberg, 15 Stevens St., Nashua, NH (US) 03060; Rengarajan Seshadri, 191, "Kailash" $4^{th}$ Cross, Teachers Colony, Nagarbhavi, Bangalore (IN) 560 072; Vasudevan Comandur, G4, Abu Apartments, 10, Artillery Road, Ulsoor, Bangalore (IN) 560 008; Abhishek Mehta, 565, $1^{st}$ Floor, $6^{th}$ A Cross, $10^{th}$ Main, HAL $3^{rd}$ Stage, Bangalore (IN) 560 075; Amit Goel, 60, $3^{rd}$ Cross, $5^{th}$ Main, KEB Layout, Sanjaynagar, Bangalore (IN) 560 094

( * ) Notice: Subject to any disclaimer, the term of this patent is extended or adjusted under 35 U.S.C. 154(b) by 374 days.

(21) Appl. No.: 11/451,255

(22) Filed: Jun. 10, 2006

(65) Prior Publication Data

US 2007/0214404 A1    Sep. 13, 2007

(30) Foreign Application Priority Data

Mar. 8, 2006  (IN) ............................ 406/CHE/2006

(51) Int. Cl.
*G06N 5/00* (2006.01)
(52) U.S. Cl. .................... 706/45; 715/205; 715/231
(58) Field of Classification Search ................. 706/45; 715/205, 231
See application file for complete search history.

(56) References Cited

U.S. PATENT DOCUMENTS

2004/0103367 A1*  5/2004  Riss et al. ............... 715/506

* cited by examiner

*Primary Examiner*—David R Vincent
*Assistant Examiner*—Mai T Tran
(74) *Attorney, Agent, or Firm*—Ash Tankha

(57) ABSTRACT

A computer implemented method and system is disclosed herein for constructing reports, comprising the steps of providing the information of interest of a user and generating the writing style of a user. The step of generating the writing style further comprises the steps of generating a prose style and report pattern style, generating the rendering style of a user, and applying the writing style to the information of interest to provide the constructed report. The method of deriving the prose style comprises the steps of deriving preferred equivalent name set entry sets, preferred equivalent pattern specification sets; and embellishment patterns.

12 Claims, 5 Drawing Sheets

REPORT CONSTRUCTION METHOD APPLYING WRITING STYLE AND PROSE STYLE TO INFORMATION OF USER INTEREST

BACKGROUND

The method and system disclosed herein, in general, relates to information analysis and specifically relates to a system and method for presenting the information of interest of an end user in the preferred writing style of the end user.

The world-wide web contains billions of web pages of information. In addition, a large amount of information is also stored on enterprise systems, public and commercial databases, etc. As the number of information sources increase, identifying or finding the information of interest is requiring more time and becoming increasingly difficult for a user. There is a market need to find and present the information of interest to a user from one or more of the aforementioned sources of information.

In order to provide to the user his/her information of interest, culled from a body of source information in an acceptable amount of time, co-pending patent application titled "Capturing reading style", Patent application No. 1819/CHE/2005 filed in India on Dec. 13, 2005 illustrates a method of capturing the reading style of a user, wherein the reading style is a set of one or more declared patterns. A declared pattern contains a set of source components. The user declares patterns from source components. There are different kinds of source components such as sentences, paragraphs, etc. Co-pending patent application "Pattern Generation", generates equivalent patterns that includes all the manifestations of the declared pattern of an end user's reading style, thereby providing the ability to comprehensively and accurately determine the information of interest from an information source.

When the information of interest has been determined using the method and system disclosed in patent application titled "Capturing Reading Styles", the information of interest needs to be presented to the end user in the user's preferred style of presentation. There is an unmet market need to present the above information interest in the preferred presentation style of the end user.

SUMMARY OF THE INVENTION

The method and system disclosed herein presents the information of interest in the preferred presentation style of the end user. The presentation style comprises the writing style and the rendering style.

The method and system disclosed herein constructs reports from an information of interest. The writing style of a user is first generated. The writing style comprises a prose style and a report pattern style. The report is rendered to the user in the user's preferred rendering style. The writing style and the rendering style are applied to the information of interest to construct said reports. The information of interest was generated as a result of applying the reading style of a user to a plurality of information sources. The formal style is applicable in a formal business environment, and is inclusive of, but not restricted to business e-mail, business plans, presentations. The informal style is applicable for communication with friends and casual business settings, and is inclusive of but not restricted to e-mail and general informal correspondences.

The prose style of a user is derived from preferred equivalent name sets and preferred equivalent pattern specification sets. The equivalent name sets and the equivalent pattern sets are derived from the reading process. The preferred equivalent name set entries are derived from the equivalent name sets for the given context. Similarly, the preferred pattern specification set is derived from the equivalent pattern specification set for the given context.

The preferred pattern set further comprises embellishments that are words or phrase that the author characteristically uses to describe a subject, object or verb. The embellishments are selected from the equivalent name sets depending on the context of the information of interest.

The constructed report contains report sections that are arranged by a user specified method of sequencing the contents of the report. The sequence can either be fixed or computed. In a fixed sequence, either a specific hierarchy or an ordered list of semantic items is defined explicitly. In a computed sequence, a user defined method is applied to determine the sequence of semantic items. During the creation of a computed sequence by the user, the user provides a specific method for determining the sequence of the contents of the report. This method is typically based on the number, kinds, and values of the specific information of interest found, relative to their position in the hierarchy of semantic items.

BRIEF DESCRIPTION OF THE DRAWINGS

The foregoing summary, as well as the following detailed description of embodiments, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF THE INVENTION

Figure 1:
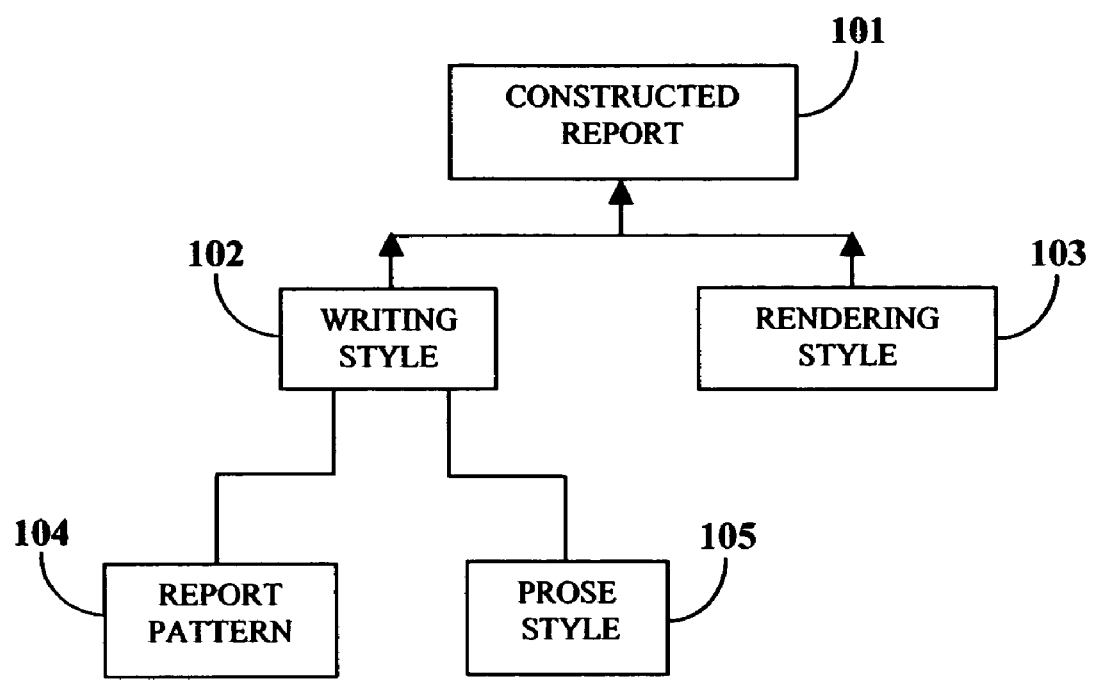
FIG. 1 illustrates the structure of a report.

The definitions of the technical terms used herein are provided below.

Declared pattern (DP): A pattern that matches words found in a sentence.

Document: A document is an electronic file, comprising one or more of the following: text, pictures, audio and video.

Embellishment patterns: An embellishments pattern prescribes a word or phrase that accompanies the subject, object or verb. Each writer has a specific embellishment pattern set that they typically use while writing.

Equivalent pattern specification (EPS) sets: Sets of equivalent pattern specifications that for a given language represent different ways of saying the same thing.

Equivalent name set (ENS): Set of words that have the same meaning.

Information of interest: The relevant information desired in the language-specific LS information source.

Information source: Information, for example, one or more source documents to be read.

Private ontology: Comprises semantic items and their inter-relationships. The private ontology is structured specifically to the view of a user. A private ontology comprises definitions of semantic items in a domain of interest of the user and defines the relationship between the semantic items.

Prose style: A prose style is a specific set of language patterns with a specific choice of vocabulary. The vocabulary includes equivalent name sets and embellishments Reader module: A system and process for scanning the LS information source to produce the information of interest (IOI) by using the generated LS reading pattern recognition rules (rules code), LS reading syntactic context processing rules (code), and LS ENS.

Reading pattern generator: A method and system that generates a set of language-specific world view-specific sentence patterns that expand upon the declared sentence pattern, thereby recognizing a larger number of matching word patterns in an information source.

Reading style: A set of one or more declared patterns. A declared pattern contains a set of source components. A pattern identifies a specific semantic item. The user declares patterns from source components and thereby captures the reading style. There are different kinds of source components such as sentences, paragraphs, etc.

Reading plan: The reading plan is a set of steps defined by the user that identifies and controls the evaluation sequence of a source document. The reading plan allows for efficient processing of source documents by reducing the amount of data to be evaluated.

Report pattern: A report pattern is composed of a plurality of report sections that are arranged in a predetermined information sequence.

Semantic item: A semantic item is one of the following: a thing, a type of thing, a characteristic, or a relationship between things and types of things.

Sentence patterns: Generated patterns that are able to recognize a large number of matching word patterns found in language specific information sources.

Worldview: The worldview of the user comprises the reading style, reading plan and private ontology of the user. It reflects the logic and structure with which a user comprehends a document.

World view acquisition (WVA): A process for interacting with a user to produce declared sentence patterns, reading plans, and private ontologies.

FIG. 1 illustrates the structure of a report. The constructed report 101 displays the desired information of the user in the user's preferred presentation structure. The user's preferred writing style 102 and rendering style 103 govern the preferred presentation structure. The report pattern 104 and prose style 105 define the user's preferred writing style 102. The user may have a plurality of preferred writing styles 102. For example, consider the case of a user who is a financial stockbroker by profession and a traveler by hobby. The user may desire to view economic information about India in his or her preferred writing style, for example, in the typical structure of a country economic report issued by Moody's. Whereas, the same user may desire to read travel information on India in a manner presented by the authors of the travelogue "Lonely Planet".

Figure 2:
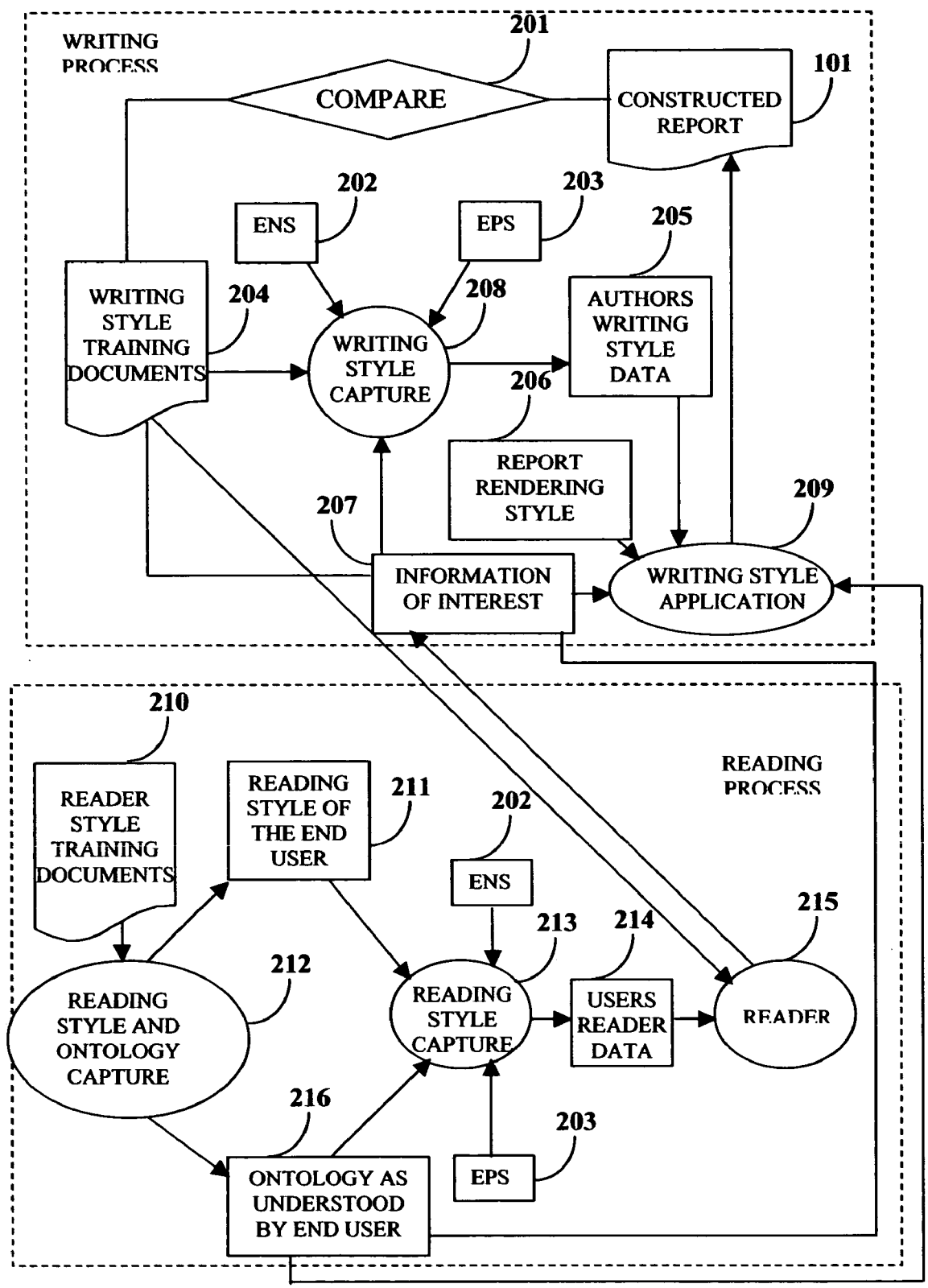
FIG. 2 illustrates an overview of the method for constructing reports.

FIG. 2 illustrates an overview of the method of constructing reports. The details of the reading process are described in detail in the co-pending patent applications "Capturing reading style" and "Patten generation". However, in brief, the reading style 211 and the ontology 216 of the user are captured using the method described in the above two patent applications. The reading style 211 and the ontology 216, along with equivalent pattern set (EPS) 203 and equivalent name sets (ENS) 202, are fed into the reading style capture 213 to generate users reader data 214. The reader 215 applies the reader data 214 to the writing style training documents 204 to generate the information of interest (IOI) 207 of the user.

The equivalent pattern set (EPS) 203, equivalent name sets (ENS) 202, the writing style training documents 204 along with the information of interest 207 are fed into the writing style capture 208 process to generate the user's writing style data 205. The user's writing style data 205 comprises the users preferred prose style 105 and report pattern 104. The user's writing style data 205 is applied 209 in conjunction with the report rendering style 206 to the information of interest 207 to construct the report.

The writing style 101 is perfected iteratively using training documents 204. Writing style training documents 204 are referenced by the IOI 207. For example, consider the annual reports of CocaCola Inc. Assume that CocaCola Inc. uses a similar annual report format every year. Consider the case of an annual report for CocaCola Inc. constructed for the year 2005. This report is constructed using raw data and the writing and rendering style derived from the annual reports of the previous years that were used as training documents. This constructed annual report for 2005 is then compared with the actual annual report of 2005 and manual or automated corrections to the writing and rendering style are appropriately made.

Figure 3:
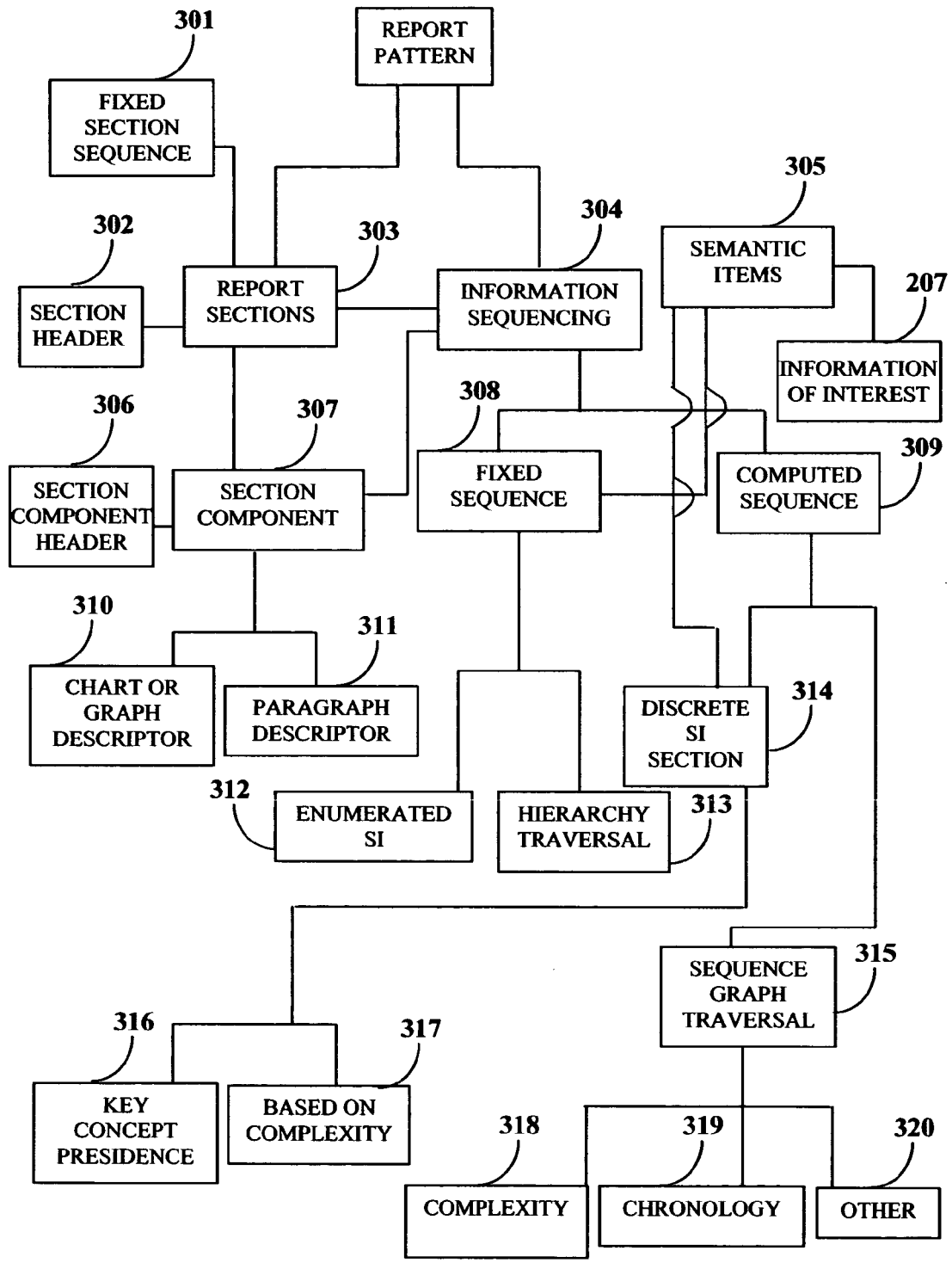
FIG. 3 illustrates the creation and application of the report pattern.

FIG. 3 illustrates the creation and application of a report pattern. A report pattern 104 is composed of a plurality of report sections 303 that are arranged in a predetermined information sequence 304. The report section 303 may in turn, comprise one or more report sections 303. Each report section 303 comprises one or more section components 308. Each section component 308 may optionally contain a section header 306, and optionally comprises chart or graph descriptors 310 and paragraph descriptors 311. The information sequencing 304, i.e. the sequence of the sections in the report may either be a fixed sequence 307 or a computed sequence 309. The fixed sequencing 307 does not depend on the information of interest 207.

The fixed sequence 307 is derived based on semantic items 305 in the ontology. In the case of the fixed sequence 307, either the traversal can be based on hierarchy traversal 313 or the traversal can be based on a defined enumeration of semantic items 312. There are various algorithms that can be used to traverse a graph, for example, a set of sibling nodes can be traversed, followed by traversing an adjoining set of sibling node; or the graph can be traversed by traversing from a node to its daughter node and traversing further down the graph. In the case of the fixed sequence 307, the method of sequencing the traversal is based on the private ontology of the user 216 and not on the information of interest 207. For example, consider the information of interest to be the accomplishments of the year for ABC Truck Company Ltd. The accomplishments will include the accomplishments of the truck division, engine division and engine parts division. The aforementioned three divisions presented in a sequence represent a fixed sequence. In the user's ontology, the three divisions are described in a certain fixed hierarchy, i.e., the truck division is first, followed by the engine division, and finally followed by the spare parts division. Hence, the hierarchy of these divisions is traversed in a fixed manner. Even if there is no information available on the spare parts division, the section header would still be presented, without any underlying content.

Consider the following example of a hierarchy traversal. Consider a monthly report with a list of projects, wherein the projects are of different types such as external client projects, internal client projects, government projects etc. The graph traversal algorithm that depends on the private ontology of the user will involve traversing to a project, then traversing to that project's children and then traversing further down to the children's children. An example of a child of an external project is the logistics activity, and an example of the child's child is the type of vehicle used, such as heavy trucks used in the logistics activity. In a sequence graph traversal, the information of interest is reorganized into lists based on chronology, such as oldest to newest, or based on complexity, for example from the simplest concept to the most complex concept etc.

There could be multiplicities of hierarchies. For example, the accomplishments could be arranged by the accomplishments of heavy trucks, light trucks, passenger trucks etc. In the alternative, the accomplishments could also be arranged on the basis of geographical regions, such as the accomplishments of the North American division, South American Division, Asian Division etc. However, in the case of the fixed sequence, for a single hierarchy under consideration, the hierarchy can only be traversed in one path.

In the case of the computed sequence 309, the user states their sequence requirements in a customized fashion not necessarily following any hierarchy. For example, the user might require sales information first presented by quarter and then by financial year, followed by calendar year sales. The computed sequence 309 follows no fixed logic; it reflects the user's contextual requirements. For example, if a user requests information on Uganda, the user may prefer to chronologically have the information presented in the order of the latest information listed first. The computed sequence 309 is typically used in scenarios where the user is not exactly sure of what he or she wants, and the user discovers their needs as they are presented with new information.

The computed sequence 309 is captured based on the users observation of the information of interest (IOI) 207, and is derived based on discrete semantic items or on a sequence graph traversal 315. The sequence graph traversal 315 is based on traversing a graph wherein the user computes the nodes in the graph. In the case of discrete semantic items 314 traversal, the algorithm that operates on the IOI then selects the next IOI. Each concept has a defined level of precedence. The algorithm operates on the basis of the precedence levels or on the basis of complexity 318. The algorithm selects one semantic item from one run of an IOI 207.

The semantic items 305 within the discrete semantic items graph are derived from the semantic items 305 within the information of interest 207 of the user. The sequence graph traversal 315 is based on complexity 318, chronology 319 or other 320 types of traversal paths.

Figure 4:
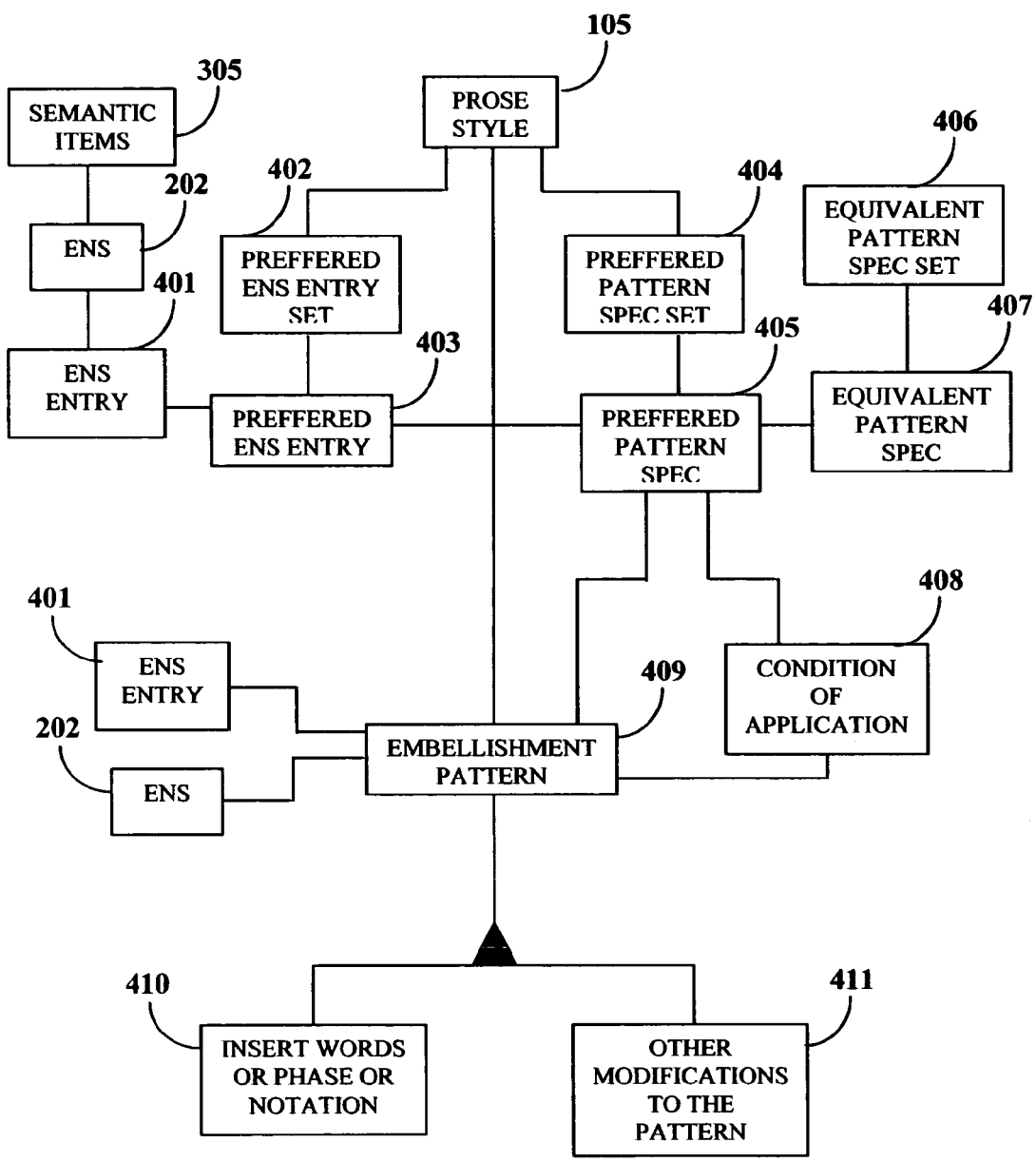
FIG. 4 illustrates the creation and application of the prose style.

FIG. 4 illustrates the creation and application of prose style. Prose is a specific language pattern with a specific choice of vocabulary. The specific language pattern is preferred equivalent pattern specifications sets 404 and preferred ENS entry sets 403. A declared pattern is captured during the reading process and the equivalent pattern specification 407 and the equivalent pattern specification set 406 are identified for this declared pattern. A preferred pattern specification 405 is selected from the equivalent pattern specification 407, and multiple such selections are populated into a preferred equivalent specification set 405. A set of these selections includes multiple representations of a singular meaning.

For a given language, each semantic items 305 maps to a single ENS 202. The equivalent name set 202 contains multiple items, i.e. multiple entries. A preferred ENS entry 403 is selected from the ENS entries 401. Multiple such selections are populated into a preferred ENS entry set 403.

The vocabulary is derived from the equivalent name sets (ENS) 202, the ENS 202 is captured during the reading process. For the semantic items 305 in the information of interest 206, corresponding ENS entries 401 are mapped and identified.

An embellishments pattern 409 is a word or phrase that accompany the subject, object or verb. Each writer has a specific embellishment pattern 409 that they typically use while writing. The embellishments are captured during the reading process. The embellishments are a subset of the ENS 202. Natural language processing is used to determine the type of embellishment, such as if the embellishment is an adjective or adverb etc. If the embellishment uses a specific ENS 202, then that specific ENS 202 is recorded. The condition of application 408 is the environment or conditions under which the embellishment is applied. Depending on the condition of application 408, the appropriate embellishment is identified. Also, depending on the usage context, words or phrases can be inserted 410 in the embellishment pattern 409, and other modifications 411 are performed for the identified embellishment pattern. For example, if a user would like the subject or the information of interest presented to him or her in the writing style of the novelist P. G. Wodehouse, the subject "snore" would be embellished with the words "snore that sounds like a fog horn".

Figure 5:
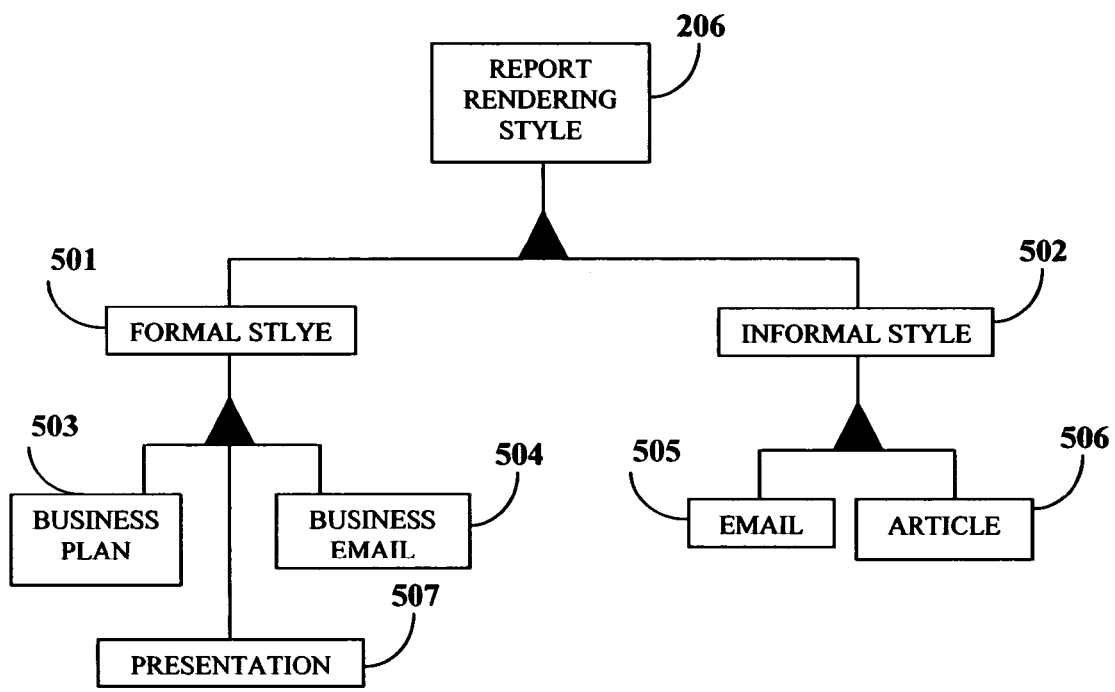
FIG. 5 illustrates the creation and application of the report rendering style.

FIG. 5 illustrates the method and system used for rendering the report to the user. FIG. 5 is exemplary and not restrictive; in addition to the formal and informal style there are multiple other styles of presenting the report. The report rendering style 206 is classified in formal style 501 and informal style 502. The formal style 501 is applicable in a formal business environment, and is inclusive of, but not restricted to business e-mail 504, business plans 503, presentations 507 (such as Microsoft Powerpoint® of Microsoft Inc.), etc. The informal style 502 is applicable for communication with friends and casual business settings, and is inclusive of but not restricted to e-mail 505, articles 506 etc.

Consider an example of a formal report rendering style for an e-mail sent by a Joe Smith, Patent Attorney. The formal structure would include a confidentiality statement inserted at the end of the e-mail. The recipient of the e-mail would be addressed by "Mr" or "Ms." Followed by the last name, and then followed by ":". This would reflect Joe Smith's personal style of writing business e-mails.

Consider an example of an informal report rendering style for e-mail sent by Joe Smith to his friend Adam Wood. In this example, the recipient of the e-mail, i.e. Adam Wood would be addressed by "adam", followed by ",". Sentences in the body of the e-mail do not start with a capital letter. This would reflect Joe Smith's personal style of personal writing e-mails.

An example of the structure of a report and writing style is briefly outlined below. For a marketing monthly summary report provided for the marketing manager of a company, the structure of the report could comprise a first section on the new clients, a second section on new product introductions, followed by a third section on sales targets. The writing style, renders the report containing these three sections displayed in a cascaded form, surrounded by market share pie charts, and the prose with headings such as "target market", "competitors", etc.

The foregoing examples have been provided merely for the purpose of explanation and are in no way to be construed as limiting the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method of constructing a report from an information of interest of a user and presenting said report in a writing style specified by said user, comprising the steps of:

extracting said information of interest of the user from a plurality of information sources;

generating the writing style of the user using a writing style training document and the information of interest, wherein said writing style further comprises:

a prose style of said user created using a plurality of equivalent name sets comprising set of words having the same meaning, wherein said prose style further comprises a plurality of equivalent pattern specification sets and a plurality of embellishments, wherein said embellishments are selected from the equivalent name sets depending on the context of the information of interest; and a report pattern style; and applying the writing style and a rendering style specified by the user to the information of interest to construct said report.

2. The computer implemented method of claim 1, wherein the information of interest is generated by applying a reader data to said writing style training document, and wherein a reading style and a private ontology of the user, along with an equivalent pattern set and an equivalent name set are fed into a reading style capture module for generating said reader data.

3. The computer implemented method of claim 1, wherein the method of constructing the report, further comprises the step of generating the rendering style of the report.

4. The computer implemented method of claim 1, wherein each of the embellishments applicable for creating said prose style is one of a word and a phrase accompanying one of a subject, object and a verb used for constructing said report from the information of interest of the user.

5. A computer implemented method of creating a prose style of a user, for the purpose of applying said prose style to an information of interest in a given context, comprising the steps of:

providing equivalent name sets;

deriving a plurality of preferred equivalent name set entries from said equivalent name sets for said given context;

providing a plurality of equivalent pattern specification sets;

deriving a preferred pattern specification set from said equivalent pattern specification sets for the given context; and creating said prose style based on said preferred equivalent name set entries and said preferred pattern specification sets.

6. The computer implemented method of claim 5, wherein said equivalent name set is captured in the process of capturing the reading style of the user.

7. The computer implemented method of claim 5, wherein the equivalent name set entries are mapped and identified for semantic items that are contained in the information of interest.

8. The computer implemented method of claim 5, wherein the preferred pattern specification set further comprises embellishments that are words or phrases that the user characteristically uses to describe a subject, an object or a verb, and wherein said embellishments are applicable for creating said prose style and are selected from the equivalent name sets depending on the context of the information of interest.

9. A computer implemented method of creating report patterns, comprising the steps of:

defining a plurality of report sections that are arranged in a predetermined information sequence;

defining a fixed sequence of said report sections based on a plurality of semantic items in a private ontology of the user, wherein said fixed sequence allows hierarchy traversal in a fixed path;

deriving a computed sequence of said report sections based on one of:

a discrete semantic items graph traversal, wherein said semantic items within said discrete semantic items graph traversal are derived from said information of interest of the user; and a sequence graph traversal, wherein the user computes nodes in a graph for traversing through said graph;

creating said report pattern style by sequencing the report sections in one of said fixed sequence and said computed sequence, wherein said computed sequence is captured based on the observation of the information of interest by the user.

10. The computer implemented method of claim 9, wherein said fixed sequence is derived through a traversal based on hierarchy.

11. The computer implemented-method of claim 9, wherein said fixed sequence is derived through a traversal based on a defined enumeration of said semantic items.

12. The computer implemented method of claim 9, wherein the report section comprises one or more section components, and wherein the one or more section components comprise one or more of:

a section header;

a plurality of chart graph descriptors; and a plurality of paragraph descriptors.

* * * * *